United States Patent
Ahrens

(10) Patent No.: US 7,095,527 B2
(45) Date of Patent: Aug. 22, 2006

(54) METHOD AND APPARATUS FOR PRINTING TRANSPARENT GRAPHICS

(75) Inventor: Kai Ahrens, Padenstedt (DE)

(73) Assignee: Sun Microsystems, Inc., Santa Clara, CA (US)

( * ) Notice: Subject to any disclaimer, the term of this patent is extended or adjusted under 35 U.S.C. 154(b) by 803 days.

(21) Appl. No.: 09/728,717

(22) Filed: Nov. 30, 2000

(65) Prior Publication Data

US 2002/0018239 A1    Feb. 14, 2002

(30) Foreign Application Priority Data

Dec. 14, 1999   (EP)   ............................. 99124941

(51) Int. Cl.
*G06F 15/00*   (2006.01)
(52) U.S. Cl. .................. 358/1.18; 358/2.1; 358/538; 358/540; 358/1.16; 358/1.9; 345/619; 345/636; 345/629; 382/176
(58) Field of Classification Search ............ 358/1.11, 358/1.18, 2.1, 487, 488, 506, 530, 538, 540, 358/1.16, 1.9; 345/619, 856; 382/173, 175, 382/176, 178, 190; 700/219
See application file for complete search history.

(56) References Cited

U.S. PATENT DOCUMENTS

| 5,063,375 | A | * | 11/1991 | Lien et al. ................... 345/616 |
|---|---|---|---|---|
| 5,335,316 | A | * | 8/1994 | Toyokura ................... 358/1.16 |
| 5,504,842 | A | | 4/1996 | Gentile ........................ 395/114 |
| 5,555,003 | A | * | 9/1996 | Montgomery et al. ...... 345/856 |
| 5,687,303 | A | * | 11/1997 | Motamed et al. ........... 358/1.18 |
| 5,959,867 | A | * | 9/1999 | Speciner et al. ............ 700/219 |
| 6,020,894 | A | * | 2/2000 | Silverbrook ................. 345/619 |
| 6,025,927 | A | * | 2/2000 | Honma ........................ 358/1.18 |
| 6,151,030 | A | * | 11/2000 | DeLeeuw et al. ........... 345/592 |
| 6,353,441 | B1 | * | 3/2002 | Bou et al. .................... 345/624 |
| 6,377,354 | B1 | * | 4/2002 | Nguyen et al. ............. 358/1.11 |
| 6,507,413 | B1 | * | 1/2003 | Mueller et al. .............. 358/1.9 |
| 2002/0018593 | A1 | * | 2/2002 | Oohmura et al. ........... 382/173 |

FOREIGN PATENT DOCUMENTS

EP   0 924 653 A2   6/1999

\* cited by examiner

*Primary Examiner*—Kimberly Williams
*Assistant Examiner*—Beniyam Menberu
(74) *Attorney, Agent, or Firm*—Gunnison, McKay & Hodgson, L.L.P.; Forrest Gunnison

(57) ABSTRACT

A method for printing documents containing transparent graphics objects includes creating a transparency list containing the transparent graphics objects of said document, and printing only objects contained in said transparency list as bitmaps.

20 Claims, 5 Drawing Sheets

METHOD AND APPARATUS FOR PRINTING TRANSPARENT GRAPHICS

BACKGROUND OF THE INVENTION

1. Field of the Invention

The present invention relates generally to a method and an apparatus for printing graphics, and in particular to the printing of documents containing transparent graphics.

2. Description of Related Art

The most common purpose for which present day personal computers are used is word processing. A word processing application allows the user to create text documents, to edit text documents, and to print text documents on a printer.

Most word processing applications offer the possibility to import graphics into a text document, or to generate graphics in a text document. These graphics may be transparent graphics, which means the graphics may be transparently superimposed on another object of the text document, such as some text or any other graphics object. The most common way to represent such transparency information is the so-called alpha channel, which uses the uppermost eight bits of thirty-two bits for each pixel to represent the transparency information.

In document 100, shown in FIG. 1, the graphics objects 110 and 120 are transparent graphics objects. Text object 130 overlaps transparent graphics object 110 and text object 150 overlaps transparent graphics object 120. Text object 140 does not overlap any transparent graphics object.

To ensure an acceptable printing quality, according to the prior art, text documents containing transparent graphics objects, such as text document 100, had to be printed as bitmap objects. This means that the whole page of a document containing transparent graphics objects had to be converted into a bitmap for printing on a printer. This was necessary to ensure that the text elements, which might overlap with the transparent graphics objects, were of acceptable printing quality. Converting the whole page of a text document into a bitmap was performance and memory consuming.

SUMMARY OF THE INVENTION

According to an aspect of the present invention there is provided a computer-based method for printing documents containing transparent graphics objects, which prints the transparent graphics objects as bitmaps and the other elements of the document, such as text elements, without converting them into a bitmap. By printing only the transparent graphics objects as bitmaps, memory as well as processing power can be saved.

For a document to be printed, a transparency list is created into which all transparent graphics objects of the document are inserted. Preferably, the other elements contained in the document such as text elements, lines, polygons, etc., are examined as to whether they overlap with the objects contained in the transparency list. If an overlap is found, the overlapping object also is inserted into the transparency list. Hence, elements overlapping with transparent graphics objects are, as a whole, printed as bitmaps.

In one embodiment, a frame is generated for each object in the transparency list. A frame defines the area to be printed as a bitmap. By defining the area to be printed as a bitmap, the frame also defines the area, which does not need to be printed as a bitmap, namely the area lying outside of the frame. For each object contained in the transparency list, there is created such a frame defining the bitmap area.

In one embodiment, the frame generated for each object in the transparency list is composed of several subframes, to reduce the area covered by the whole frame. Specifically, the shape of the transparent graphics object together with its overlapping object is approximated by several rectangular subframes to minimize the area covered by the total frame composed of the several subframes.

Hence, in one embodiment, a tool is provided for printing transparent graphics objects contained in a document without the need of converting the whole page where the transparent graphics objects are located into a bitmap. Thereby, the tool saves memory and processing power when printing text documents which contain transparent graphics objects.

BRIEF DESCRIPTION OF THE DRAWINGS

In the drawings and the following detailed description, elements with the same reference numeral are the same element. Also, the first digit of a reference numeral indicates the drawing in which that element first appeared.

DETAILED DESCRIPTION

Figure 1:
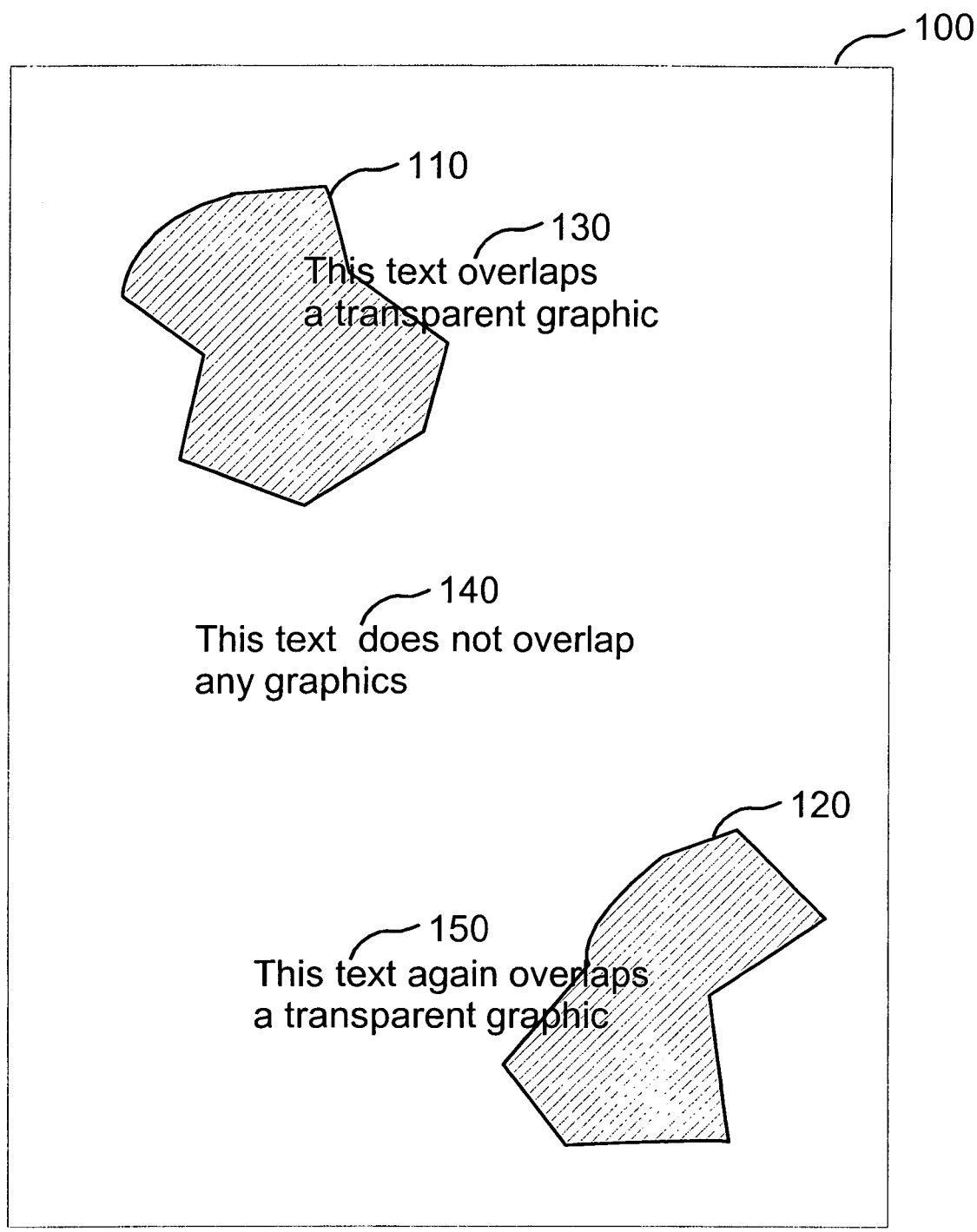
FIG. 1 is an illustration of a text document page containing transparent graphics objects and text that was converted in its entirety to a bitmap for printing in the prior art.

A word processing application 232 (FIG. 2) running on computer system 200 is used for generating a text document 235. A portion of one page of document 235 is illustrated on screen display 295 of monitor 216. This portion has a transparent graphics object and a text object that overlap as well as a text object that does not overlap any transparent graphics object. As explained more completely below, a method 230 of this invention prints documents containing transparent graphics objects overlapped with non-transparent objects more efficiently than the prior art method.

Method 230 analyzes document 235, which in this example is stored in a memory 210, and identifies each region of document 235 that contains a transparent graphics object, a transparent graphics object overlapping a non-transparent object, and no transparent graphics objects. The regions containing transparent graphics objects, or transparent graphics objects overlapping non-transparent objects are converted to bitmaps for printing. The regions of the document, such as text elements, containing no transparent graphics objects are printed without converting these regions into a bitmap. Printing only the transparent graphics objects and any overlapping objects as bitmaps saves both memory usage, and processing power.

Figure 3:
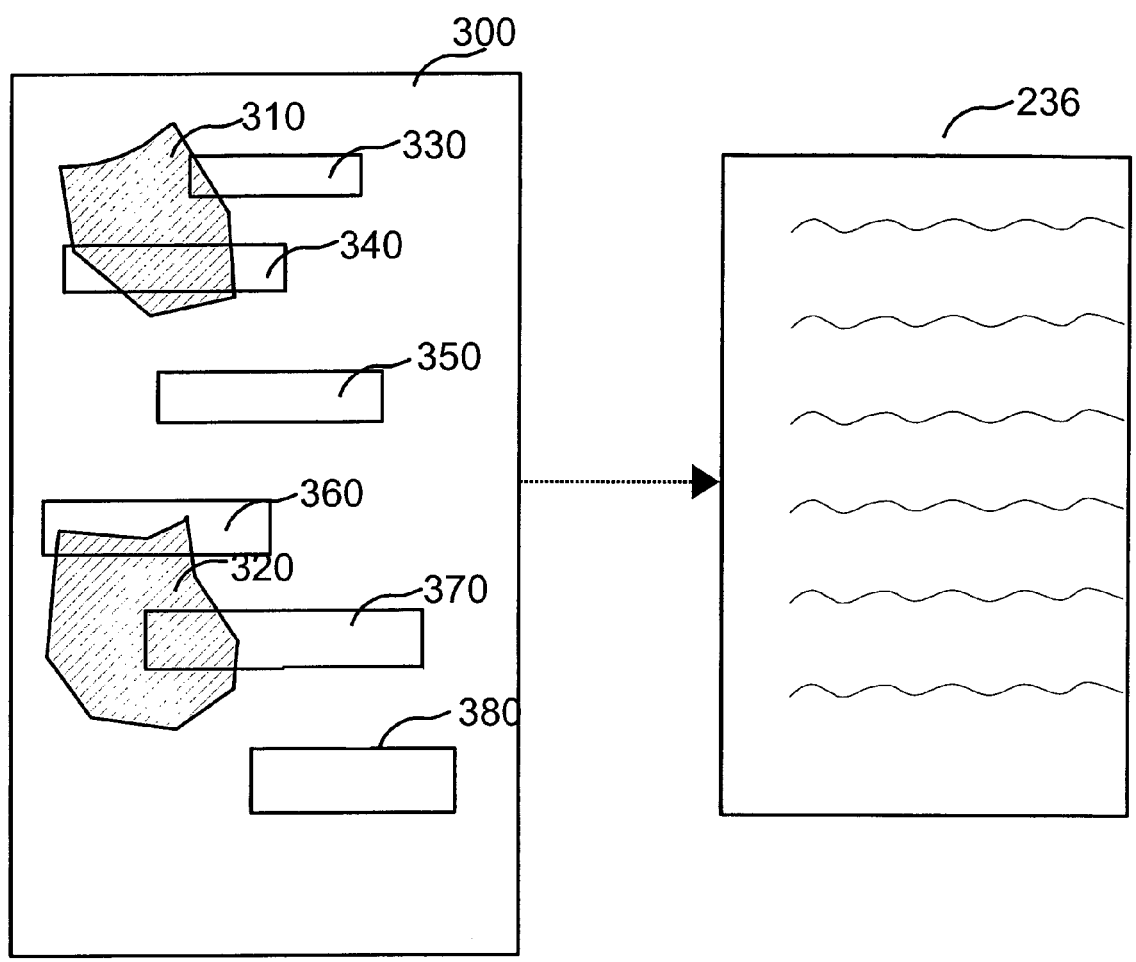
FIG. 3 schematically shows the structure of a text document containing text and transparent graphics objects, and its conversion into a metafile.
Figure 4:
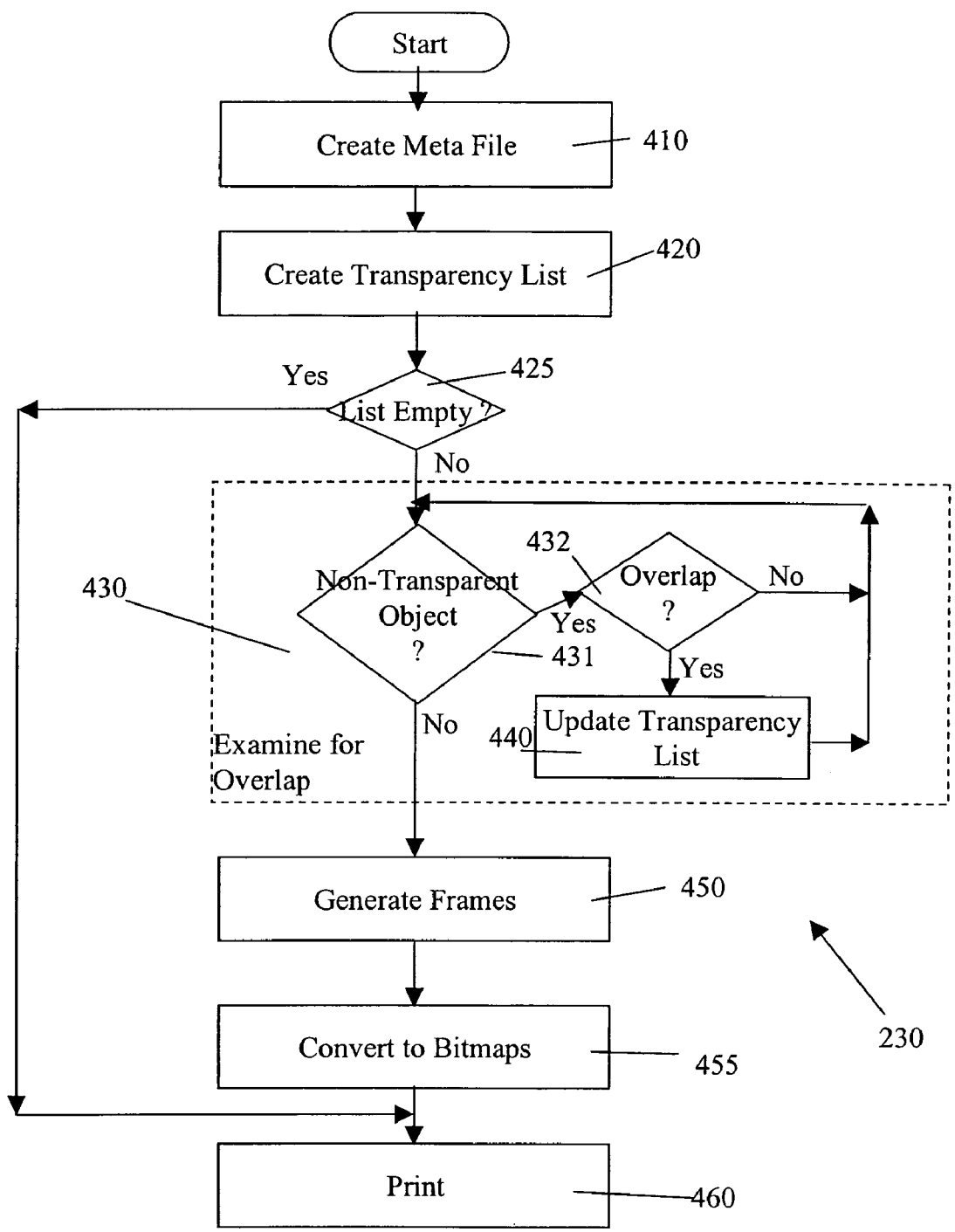
FIG. 4 is a process flow diagram of a printing method according to one embodiment of the present invention.

A text document having a similar configuration as the one shown in display screen 295 is shown in FIG. 3. Page 300 of document 235 contains transparent graphics object 310, which overlaps with text objects 330 and 340, and transparent graphics object 320 that overlaps text objects 360 and 370. Text document page 300 further contains text objects 350 and 380, which do not overlap with any graphics object. The printing of such a text document page according to the present invention is explained in more detail in the following description of method 230 with respect to FIG. 4.

In method 230, create metafile operation 410 generates a so-called metafile 236, which is a file containing information about the objects in the document to be printed. More particularly, metafile 236 contains information about which kind of objects—graphics or non-graphics—are to be printed, and where these objects are located on page 300. The generation of such a metafile is often used in a printing process to provide printer 217 with the information necessary for carrying out the printing procedure. Consequently, methods for generating a metafile are known to those of skill in the art.

In this example, metafile 236 is generated in operation 410 and is schematically shown in FIG. 3. Operation 410 transfers processing to create transparency list operation 420.

In operation 420, metafile 236 is examined to determine whether metafile 236 contains transparent graphics objects. A transparent graphics object is a first object, which does not obscure a second object that overlaps the first object. In other words, the second object appears to the user as lying behind the first object that is transparent. The information used to identify the transparent graphics objects in metafile 236 depends upon the particular type of the transparent graphics object. For example, the information may obtained from the so-called alpha channel for the object, or from the bitmap itself if the object is a bitmap, or perhaps from a recorded action. For example, if the recorded action is DrawTransparentPolygon, the object is a transparent graphics object.

Hence, each object in metafile 236 that is a transparent graphics object is added to a transparency list 237 in operation 420. Upon completion of create transparency list operation 420, transparency list 237 contains a reference to each transparent graphics object on page 300 in this embodiment. Operation 420 transfers processing to list empty check operation 425.

If page 300 did not include any transparent graphics objects, transparency list 237 is empty, and so the processing of this invention is not required. Accordingly, check operation 425 transfers to print operation 460.

However, if transparency list 237 contains a reference to one or more transparent graphics objects, list 237 is not empty, e.g., list 237 contains at least one transparent graphics object. Thus, check operation 425 transfers processing to examine for overlap operation 430 that in turn adds to list 237 each object in metafile 236 that overlaps a transparent graphics object.

Specifically, non-transparent object check operation 431 determines whether there are any non-transparent objects in metafile 236 that have not been processed. The non-transparent objects may include, but are not limited to text elements, lines, polygons, etc. If there are one or more non-transparent objects that remain to be processed, check operation 431 identifies a current non-transparent object and transfers to overlap check operation 432 and otherwise to generate frames operation 450.

In overlap check operation 432, the current non-transparent object is checked to determine whether the current non-transparent object overlaps with any of the transparent graphics objects contained in transparency list 237. If an overlap is detected, overlap check operation 432 stops processing and transfers processing to update transparency list operation 440 and otherwise returns to non-transparent object check operation 431 if no overlap was found.

Update transparency list operation 440 adds the non-transparent object that overlapped a transparent graphics object in list 237 to transparency list 237. Hence, upon completion of examine for overlap operation 430, each object found to overlap with an object contained in transparency list 237 is itself inserted into transparency list 237. Operation 440 also returns to non-transparent object check operation 431.

Thus, going through operations 420, 425 and 430 for page 300, transparent graphics objects 310 and 320 are inserted into transparency list 237 in operation 420. Each of remaining objects 330 to 380 is examined as to whether the object overlaps with any one of transparent graphics objects 310 and 320 contained in transparency list 237 in operation 430.

This is simply done by checking the remaining objects one after another as to whether they overlap with any of the objects contained in transparency list 237. By doing so, objects 330 and 340 are found to overlap with transparent graphics object 310, therefore objects 330 and 340 are inserted into transparency list 237.

Since object 350 does not overlap with any objects 310 and 320 contained in transparency list 237, object 350 is not inserted therein. However, objects 360 and 370 overlap with transparent graphics object 320. Therefore, objects 360 and 370 are inserted into transparency list 237, thereby completing list 237. Object 380 does not overlap with any of objects 310 and 320 contained in transparency list 237. Therefore, object 380 is not inserted into transparency list 237.

Hence, upon completion of operation 430, transparency list 237 contains a list of objects that are either transparent graphics objects or are non-transparent objects that overlap a transparent graphics object. By including the overlapping objects in transparency list 237, it assures that those objects overlapping with transparent graphics objects are, as a whole, printed as bitmaps.

In this manner, the undesirable splitting of an overlapping non-transparent object, such as splitting a text element into two elements, one that is printed as a bitmap and one that is printed as characters, can be avoided since such a split usually leads to unfavorable printing results. This is because when printing characters, the printers today usually use some sophisticated algorithms to improve the resolution and the printing quality. However, for the parts of the text elements printed as a bitmap, the printer could not carry out those algorithms.

Therefore, splitting up a text element overlapping with a transparent graphics object would cause the text element to be printed out in two different printing modes, one part as a bitmap, and the other part as text characters. This problem is avoided by inserting the overlapping non-transparent objects into transparency list 237.

In generate frames operation 450, a frame is generated for each object in transparency list 237. A frame defines an area to be printed as a bitmap. By defining the area to be printed as a bitmap, the frame also defines the area for which there is no need for printing as a bitmap, namely the area lying outside of the frame. In operation 450, for each object contained in transparency list 237, a frame is created defining the bitmap area for that object. Note that a single frame may include one or more objects in list 237.

In one embodiment, the frame generated for each object in transparency list 237 is composed of several subframes to reduce the area covered by the whole frame. A frame defining a bitmap area has to be rectangular. If the object that is printed as a bitmap has a rather complicated shape, generating subframes, which together compose the total frame for this object, can reduce the area covered by the total frame. The shape of the transparent graphics object together with any overlapping objects is approximated by several rectangular subframes to minimize the area covered by the total frame composed of the several subframes.

The operations within operation 450 are more clearly understood by considering another page 500 that includes non-transparent objects overlapping transparent graphics objects. Page 500 contains transparent graphics object 505, the text object "bitmap" 510, and the text object "print" 520. Graphics object 505 is contained in the transparency list since object 505 is a transparent graphics object. Text objects 510 and 520 are included in the transparency list since they overlap with transparent graphics object 505. Together, objects 505, 510 and 520 form an overlapping transparent compound object 560, which needs to be printed as a bitmap. Similarly objects 515, 516 and 517 form another overlapping transparent compound object 570, which needs to be printed as a bitmap. Text objects 575, 580, and 590 can be printed as normal text.

In this embodiment to save memory and processing power, generate frames operation 450 creates a frame for an object to be printed as a bitmap, such that the area, which is printed as a bitmap, is made as small as possible. For this purpose, overlapping compound object 560 containing objects 505, 510, and 520 is not printed as a bitmap having a single rectangular frame 531, but rather by a bitmap the shape of which is formed by three subframes 530, 540, and 550.

If only single frame 531 covering all of objects 505, 510, and 520 were generated, single frame 531 would need to be as wide as subframe 540. However, by defining the frame of the bitmap to be printed for overlapping compound object 560 as three subframes 530, 540, and 550, the total area covered by overlapping bitmap object 560 is significantly reduced relative to the area within single frame 531. As a result, the memory necessary for storing the bitmap graphic for overlapping compound object 560 as well as the processing power necessary to process the bitmap graphic is further reduced. Notice, however, that even if only single frame 531 was used for overlapping compound object 560, this is an improvement over the prior art, because the complete page is not processed as a bitmap.

Similar processing is carried out for overlapping compound object 570, which also contains a transparent graphics object 515 and two text objects 516 and 517, and where also the overall bitmap for the total bitmap object to be printed is composed of four subframes 571 to 574. Again, the area within subframes 571 to 574 is less that the area within single frame 576. After the frames for the objects in transparency list 237 are created in operation 450, processing transfers to convert to bitmaps operation 455.

To print objects in list 237, the objects in list 237 are converted, in operation 455, into bitmaps as defined by the corresponding frames created in operation 450. The bitmaps and the other portions of document page 500 are printed in print operation 460.

Hence, with method 230 of this invention, bitmap frames 530, 540, 550, 571, 572, 573, and 574 cover less than entire page 500, and therefore whole page 500 is not converted into a bitmap. Rather, some portions of a document page are converted to a bitmap, or bitmaps, while other portions of the page are processed as non-bitmapped data. By reducing the bitmap printing to those objects and text document elements for which it actually makes sense, namely the transparent graphics objects and the overlapping text elements, the printing speed is significantly increased.

In addition by carrying out a bitmap printing only for those parts of a text document for which it actually is necessary, the memory and processing power necessary for the printing are significantly reduced. Those parts of a text document, which contain no elements overlapping with transparent graphics or which contain no transparent graphics themselves, are printed as normal text thereby taking advantage of the sophisticated performance enhancement algorithms implemented in printers for the printing of text characters. The processing and memory intensive procedure of bitmap printing is reduced to those areas where such printing is actually necessary to ensure an acceptable level of print quality. Those areas are the areas where transparent graphics objects are located, as well as those areas where text objects are located, which overlap with transparent graphics objects.

Those skilled in the art will readily recognize that the individual operations mentioned before in connection with the procedure of printing according to method 230 of the present invention can be performed by executing computer program instructions on CPU 201 of computer 200. However, in another embodiment, dedicated electronic circuits can be configured such that they perform the individual operations explained before in connection with method 230. In another embodiment, a storage medium has thereon installed computer-executable program code, and execution of the computer-executable program code causes the CPU of a computer to perform the individual operations explained above.

Figure 2:
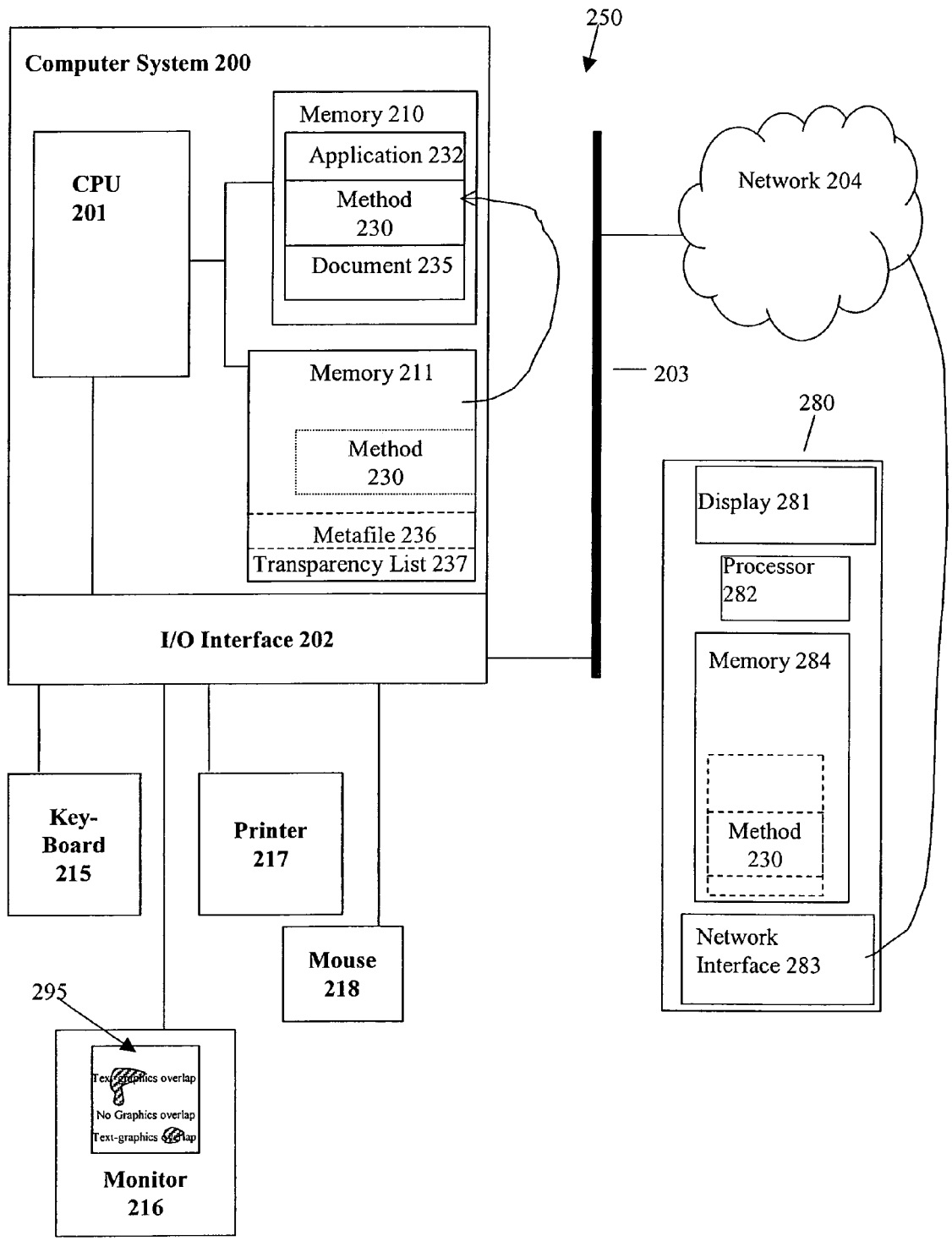
FIG. 2 is a block diagram of a computer system used in connection with the present invention.

In one embodiment, method 230 is executed on a hardware configuration like a personal computer or workstation as illustrated schematically in FIG. 2 by computer system 200. However, method 230 may also be executed on a client-server configuration 250 that also is illustrated in FIG. 2. The document containing content and template data may be displayed on a display screen of client device 200 while some or all operations of method 230 are carried out on a server computer 280, which in this example includes a display includes a display unit 281, accessible by the client device 200 over a data network 203, 204, such as the Internet, using a browser application or the like.

Herein, a computer program product comprises a medium configured to store or transport computer readable code for method 230 or in which computer readable code for method 230 is stored. Some examples of computer program products are CD-ROM discs, ROM cards, floppy discs, magnetic tapes, computer hard drives, servers on a network and signals transmitted over a network representing computer readable program code.

As illustrated in FIG. 2, this storage medium may belong to computer system 200 itself. However, the storage medium also may be removed from computer system 200. For example, method 230 may be stored in memory 284 that is physically located in a location different from processor 201. The only requirement is that processor 201 is coupled to the memory containing method 230. This could be accomplished in a client-server system 250, e.g. system 200 is the client and system 280 is the server, or alternatively via a connection to another computer via modems and analog lines, or digital interfaces and a digital carrier line.

For example, memory 284 could be in a World Wide Web portal, while display unit 216 and processor 201 are in a personal digital assistant (PDA), or a wireless telephone, for example. Conversely, the display unit and at least one of the input devices could be in a client computer, a wireless telephone, or a PDA, while the memory and processor are part of a server computer on a wide area network, a local area network, or the Internet.

More specifically, computer system 200, in one embodiment, can be a portable computer, a workstation, a two-way pager, a cellular telephone, a digital wireless telephone, a personal digital assistant, a server computer, an Internet appliance, or any other device that includes the components shown and that can execute method 230. Similarly, in another embodiment, computer system 200 can be comprised of multiple different computers, wireless devices, cellular telephones, digital telephones, two-way pagers, or personal digital assistants, server computers, or any desired combination of these devices that are interconnected to perform, method 230 as described herein.

Herein, a computer memory refers to a volatile memory, a non-volatile memory, or a combination of the two in any one of these devices. Similarly, a computer input unit and a display unit refer to the features providing the required functionality to input the information described herein, and to display the information described herein, respectively, in any one of the aforementioned or equivalent devices.

In view of this disclosure, method 230 can be implemented in a wide variety of computer system configurations using an operating system and computer programming language of interest to the user. In addition, method 230 could be stored as different modules in memories of different devices. For example, method 230 could initially be stored in a server computer 280, and then as necessary, a module of method 230 could be transferred to a client device 200 and executed on client device 200. Consequently, part of method 230 would be executed on the server processor 282, and another part of method 230 would be executed on processor 201 of client device 200. Also, FIG. 2 shows input devices 215 and 218, but other input devices, such as speech recognition software and/or hardware could be used to input the selections and data for method 230.

In yet another embodiment, method 230 is stored in memory 284 of system 280. Stored method 230 is transferred, over network 203, 204 to memory 211 in system 200. In this embodiment, network interface 283 and I/O interface 202 would include analog modems, digital modems, or a network interface card. If modems are used, network 204 includes a communications network, and method 230 is downloaded via the communications network.

Method 230 may be implemented in a computer program including comprehensive office application STAROFFICE that is available from Sun Microsystems, Inc. of Palo Alto, Calif. (STAROFFICE is a trademark of Sun Microsystems.) Such a computer program may be stored on any common data carrier like, for example, a floppy disk or a compact disc (CD), as well as on any common computer system's storage facilities like hard disks. Therefore, one embodiment of the present invention also relates to a data carrier for storing a computer program for carrying out the inventive method. Another embodiment of the present invention also relates to a method for using a computer system for carrying out method 230. Still another embodiment of the present invention relates to a computer system with a storage medium on which a computer program for carrying out method 230 is stored.

Figure 5:
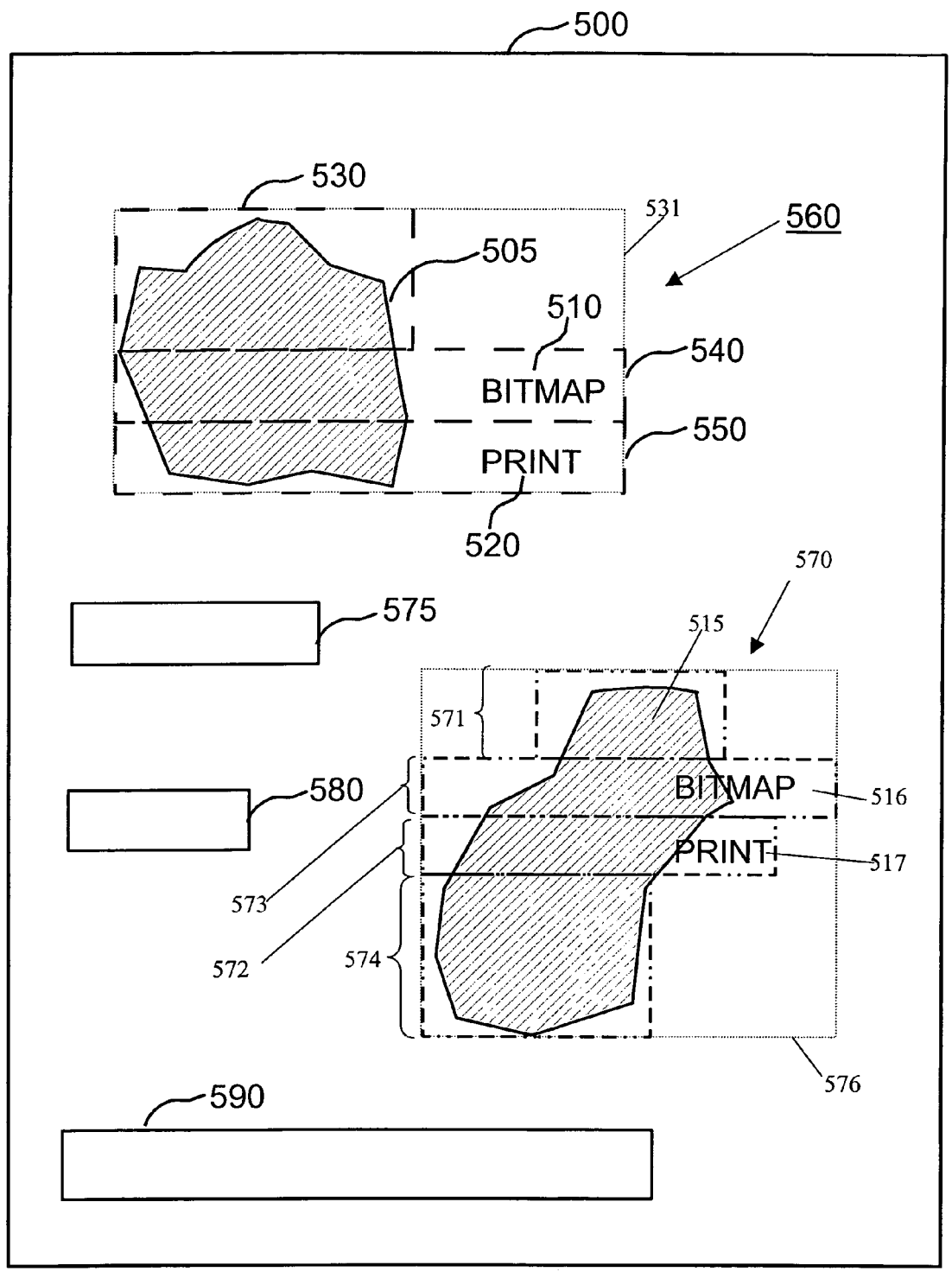
FIG. 5 shows an example of a text document to be printed using the method of this invention, and the frames used in the method.

While method 230 hereinbefore has been explained in connection with one embodiment thereof, those skilled in the art will readily recognize that modifications can be made to this embodiment without departing from the spirit and scope of the present invention. It is, for example, readily apparent to those skilled in the art that the present invention can be applied to the printing of any document containing transparent graphics, not only to text documents containing transparent graphics. Furthermore, the overlapping objects, which overlap with the transparent graphics objects, as for example shown in FIG. 2, 3, or 5, may not be only text objects but may be any other objects, such as graphics, lines, polygons, any vector objects/vector graphics, etc. Similarly, the non-overlapping objects shown in FIG. 2, 3, or 5 may not only be text objects, but any other objects as mentioned before.

In still another embodiment, method 230 is included in a tool for printing documents containing transparent graphics objects and any other objects which either overlap or do not overlap with the transparent graphics objects by dealing with those objects as explained in detail in the foregoing description. Only for exemplary purposes, one embodiment of the invention has been described by referring to text elements as the non-transparent objects, which may overlap or may not overlap with the transparent graphics objects. It is, however, clear to the expert that those overlapping or non-overlapping objects can also take the form of any other non-transparent objects.

I claim:

1. A method for processing a document page containing transparent graphics objects for printing, said method comprising:
   creating a transparency list containing a reference to each of the transparent graphics objects of said document page,
   wherein a transparent graphics object is an object, which does not obscure any other object that overlaps the object;
   determining whether said transparency list is empty;
   converting objects referenced in said transparency list into bitmaps for printing upon said determining finding said transparency list is not empty; and
   printing said document page, without performing said converting upon said determining finding said transparency list is empty.

2. The method of claim 1, further comprising:
   generating a bitmap frame for at least one object in said transparency list wherein an area of said bitmap frame is less than an area of the entire document page.

3. The method of claim 1, further comprising: processing portions of the document page that do not include objects in said transparency list as non-bitmapped data.

4. The method of claim 1, further comprising:
   examining a non-transparent object of said document page for overlap with at least one transparent graphics object referenced in said transparency list; and
   inserting said non-transparent object into said transparency list upon said non-transparent object overlapping with at least one transparent graphics object referenced in said transparency list.

5. The method of claim 1, further comprising:
   generating a frame for each overlapping compound object in said transparency list, an overlapping compound object being formed by a transparent graphics object and non-transparent objects overlapping said transparent graphics object, said frame defining an area to be printed as a bitmap in printing the overlapping compound object.

6. The method of claim 5, further comprising:
   generating said frame for each overlapping compound object as a composition of subframes.

7. A system comprising:
   a processor; and a memory coupled to said processor, and storing therein computer instructions for a method for processing a document page containing transparent graphics objects for printing wherein upon execution of said computer instructions on said processor, said method comprises:

creating a transparency list containing a reference to each of the transparent graphics objects of said document page in said memory,
  wherein a transparent graphics object is an object, which does not obscure any other object that overlaps the object;

determining whether said transparency list is empty;

converting objects referenced in said transparency list into bitmaps for printing upon said determining finding said transparency list is not empty; and printing said document page, without performing said converting upon said determining finding said transparency list is empty.

8. The system of claim 7, wherein said method further comprises:

generating a bitmap frame for at least one object in said transparency list wherein an area of said bitmap frame is less than an area of the entire document page.

9. The system of claim 7, wherein said method further comprises:

processing portions of the document page that do not include objects in said transparency list as non-bitmapped data.

10. The system of claim 7, wherein said method further comprises:

examining a non-transparent object of said document page for overlap with at least one transparent graphics object referenced in said transparency list; and inserting said non-transparent object into said transparency list upon said non-transparent object overlapping with at least one transparent graphics object referenced in said transparency list.

11. The system of claim 7, wherein said method further comprises:

generating a frame for each overlapping compound object in said transparency list, an overlapping compound object being formed by a transparent graphics object and non-transparent objects overlapping said transparent graphics object, said frame defining the area to be printed as a bitmap for printing the overlapping compound object.

12. The system of claim 11, wherein said method further comprises:

generating said frame for each overlapping compound object as a composition of subframes.

13. A computer program product comprising a tangible medium having embedded therein computer readable program code for a method for processing a document page containing transparent graphics objects for printing, said method comprising:

creating a transparency list containing a reference to each of the transparent graphics objects of said document page,
  wherein a transparent graphics object is an object, which does not obscure any other object that overlaps the object;

determining whether said transparency list is empty;

converting objects in referenced in said transparency list into bitmaps for printing upon said determining finding said transparency list is not empty; and printing said document page, without performing said converting upon said determining finding said transparency list is empty.

14. The computer-program product of claim 13, wherein said method further comprises:

generating a bitmap frame for at least one object in said transparency list wherein an area of said bitmap frame is less than an area of the entire document page.

15. The computer-program product of claim 13, wherein said method further comprises:

processing portions of the page that do not include objects in said transparency list as non-bitmapped data.

16. The computer-program product of claim 13, wherein said method further comprises:

examining a non-transparent object of said document page for overlap with at least one transparent graphics object referenced in said transparency list; and inserting said non-transparent object into said transparency list upon said non-transparent object overlapping with at least one transparent graphics object referenced in said transparency list.

17. The computer-program product of claim 13, wherein said method further comprises:

generating a frame for each overlapping compound object in said transparency list, an overlapping compound object being formed by a transparent graphics object and non-transparent objects overlapping said transparent graphics object, said frame defining the area to be printed as a bitmap for printing the overlapping compound object.

18. The computer-program product of claim 17, wherein said method further comprises:

generating said frame for each overlapping compound object as a composition of subframes.

19. A method for processing a document page containing transparent graphics objects for printing, said method comprising:

determining whether at least a part of a non-transparent object including a plurality of text words overlaps a transparent graphics object referenced in a transparency list wherein said transparent graphics object is an object, which does not obscure any other object that overlaps the object; and adding said entire non-transparent object to said transparency list when either of (a) all of said plurality of text words of said non-transparent object overlaps said transparent graphics object; and (b) only said at least a part of said plurality of text words of said non-transparent object overlaps said transparent graphics object is true.

20. The method of claim 19 further comprising:

creating said transparency list.

* * * * *

UNITED STATES PATENT AND TRADEMARK OFFICE
CERTIFICATE OF CORRECTION

| | | |
|---|---|---|
| PATENT NO. | : 7,095,527 B2 | |
| APPLICATION NO. | : 09/728717 | |
| DATED | : August 22, 2006 | |
| INVENTOR(S) | : Kai Ahrens | |

It is certified that error appears in the above-identified patent and that said Letters Patent is hereby corrected as shown below:

In Claim 13, Column 10, Line 2, before "referenced", delete "in".

Signed and Sealed this

Twentieth Day of February, 2007

JON W. DUDAS
*Director of the United States Patent and Trademark Office*